J. V. B. PARKES.
RASP OR FILE.
APPLICATION FILED JUNE 16, 1911.
1,053,639.
Patented Feb. 18, 1913.
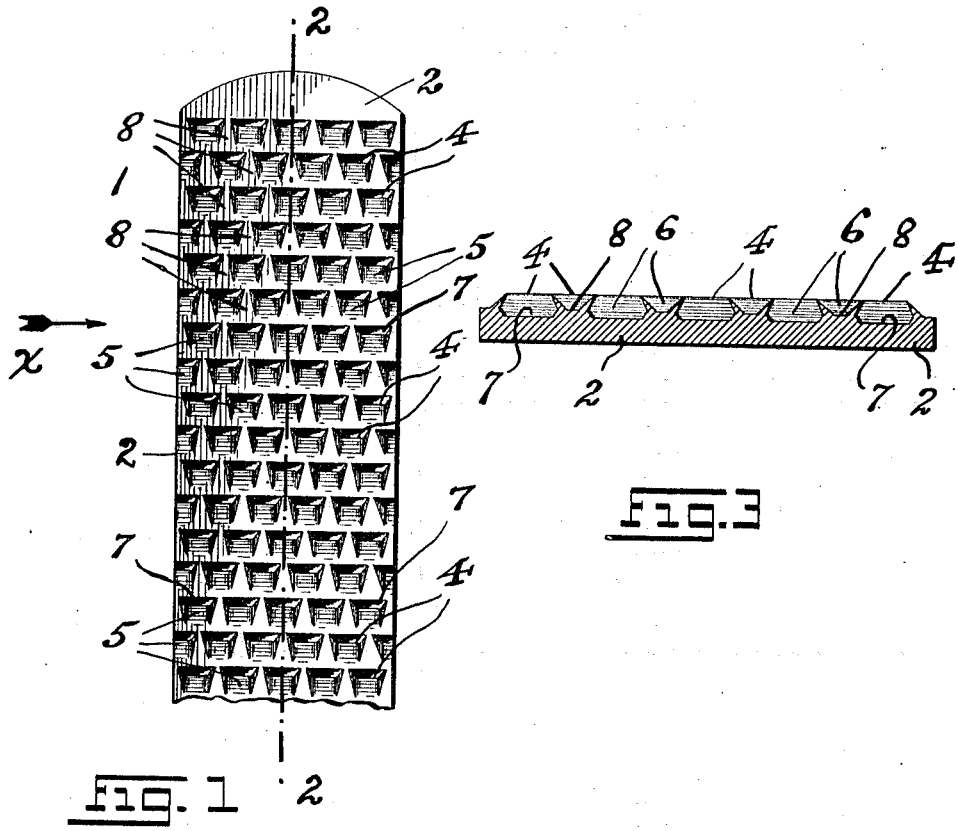
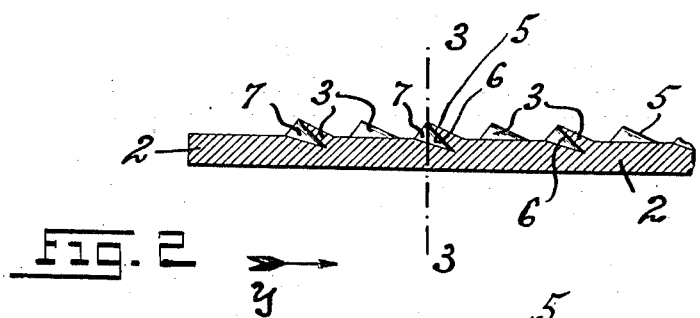
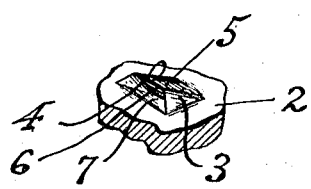
WITNESSES:
Harry E. Pfeiffer
Fredk. M. W. Fraentzel
INVENTOR:
Jeremiah V. B. Parkes,
BY
Fraentzel and Richards,
ATTORNEYS.

UNITED STATES PATENT OFFICE.

JEREMIAH V. B. PARKES, OF NEWARK, NEW JERSEY.

RASP OR FILE.

1,053,639.     Specification of Letters Patent.     Patented Feb. 18, 1913.

Application filed June 16, 1911. Serial No. 633,558.

*To all whom it may concern:*

Be it known that I, JEREMIAH V. B. PARKES, a citizen of the United States, residing at Newark, in the county of Essex and State of New Jersey, have invented certain new and useful Improvements in Rasps or Files; and I do hereby declare the following to be a full, clear, and exact description of the invention, such as will enable others skilled in the art to which it appertains to make and use the same, reference being had to the accompanying drawings, and to characters of reference marked thereon, which form a part of this specification.
The present invention has reference, generally, to improvements in tools, and the invention relates, more particularly, to an improvement in the construction of rasps or files and the teeth thereof.
The present invention has for its principal object to provide a novel construction of rasp or file, the teeth of which present rows of raised chisel-shaped cutting edges, and the teeth, in each row, being spaced apart with relation to each other and in such a manner, so as to allow the waste material or filings to escape and prevent the clogging up of the spaces between the teeth; and, furthermore, the teeth of one row being arranged so as to cut in the line of the intervening spaces between the teeth of the adjacent rows, as the file or rasp is operated, thereby assuring a clean, even, and smooth open surface of the material operated upon.
A further object of the present invention is to provide a novel construction of rasp-tooth, the same possessing a straight chisel-like cutting edge, which makes a clean shave or cut from the material operated upon, and operates to cut down the material worked upon much more rapidly, and at the same time secures a better finished surface.

In rasps or files, as heretofore constructed, the cutting portion of each tooth is made pointed, and in operating the same, over a surface, the tooth scratches off the material rather than cutting or shaving off the same, thereby leaving a rough and poorly finished surface which is full of irregular scratches.
With the novel construction of rasp-tooth made according to the principles of the present invention, the tooth will cut much faster and with less effort, and will leave a smooth and clean surface, similar to a planed surface.
Other objects of the present invention not at this time more particularly enumerated will be clearly evident from the following detailed description of the same.

With the various objects of the present invention in view, the said invention consists, primarily, in the novel construction of rasp or file hereinafter set forth; and, furthermore, this invention consists in the novel arrangements of the parts thereof, as well as in the details of the construction of the same, all of which will be more fully described in the following specification, and then finally embodied in the clauses of the claim which are appended to and which form an essential part of this specification.

The invention is clearly illustrated in the accompanying drawings, in which:

Figure 1 is a face view of a portion of a rasp or file made according to and embodying the principles of the present invention. Fig. 2 is a longitudinal section of the same, taken on line 2—2 in said Fig. 1, looking in the direction of the arrow *x*, said view being drawn on an enlarged scale. Fig. 3 is a transverse section of the rasp or file, said section being taken on line 3—3 in said Fig. 2, looking in the direction of the arrow *y*. Fig. 4 is a detail perspective view of one of the novel constructions of rasp-teeth with which said novel rasp or file is provided.

Similar characters of reference are employed in all of the hereinabove described views, to indicate corresponding parts.

Referring now to the several figures of the said drawings, the reference-character 1 indicates a complete rasp or file made according to and embodying the principles of the present invention, the same comprising a body-portion 2 which is provided upon its face with a plurality of cutting or abrading teeth.

Each cutting or abrading tooth comprises a tooth-body 3 which is struck up from said body-portion 2, so as to project above the surface of the same. Each tooth-body 3 is inclined, at the desired pitch, so as to present in proper and effective cutting position a straight chisel-like edge 4 with which each tooth-body 3 is provided. Each tooth-body 3 is formed with a substantially flat and rearwardly inclined top 5, whereby said straight chisel-like edge 4 is formed. The under side 6 of each tooth-body 3 is also substantially flat, and inclines away from the body-portion 2 of said rasp or file, so as to form a pocket 7 underneath each chisel-like edge 4. The said cutting or abrading teeth, constructed in the manner hereinbefore set forth, are arranged in rows upon the face of the said body-portion 2 of the rasp or file, either in horizontal and laterally extending rows, or in angularly disposed or obliquely extending rows, as may be desired. The teeth in each row are separated one from the other by means of intervening spaces 8, such spaces providing a means or passage for the escape of the cut or abraded particles of the material upon which the rasp or file is operated. The said straight chisel-like edge 4 of each tooth is alined with its neighbor in each row. In every alternate row of said cutting or abrading teeth, the said chisel-like edges 4 of the same are arranged so as to be in line with the spaces 8 between the adjacent rows, and do, preferably, overlap the cutting path of said teeth in the adjacent rows, immediately in the front and the rear of said alternate rows, thus providing, practically, continuous cutting edges extending laterally from side to side of said body-portion 2. Such an arrangement of said cutting or abrading teeth assures, when said rasp or file is operated, the production of a clean and smooth cut or abrasion, leaving an even and nicely finished surface, free from the irregular scratches or roughness usually produced by the old forms and styles of rasps. The straight chisel-like cutting edges 4 of said teeth render the rasp much more effective in its operation, as well as producing a more rapidly reducing or cutting action upon the material worked upon. I am aware that some slight changes may be made in the general arrangements and combinations of the devices comprising the form of rasp or file without departing from the scope of the present invention as set forth in the foregoing specification, and as defined in the clauses of the claim which are appended thereto. Hence, I do not limit my invention to the exact arrangements and combinations of the said devices and parts of the rasp or file, as described in the said specification, nor do I confine myself to the exact details of the construction of the said parts, as illustrated in the accompanying drawings.

I claim:—

A rasp or file comprising a body-portion, a plurality of integral cutting teeth formed upon and raised up from said body-portion, each cutting tooth being separated from its neighbors, each cutting tooth comprising an acutely inclined tooth body provided with a straight chisel-like cutting edge presented above the surface of said body-portion and forming in conjunction with the latter a pocket beneath the said cutting tooth and back of its cutting edge, and downwardly extending side-portions connecting the sides of each tooth-body with said body-portion adapted to brace said cutting-edge in its raised position.

In testimony, that I claim the invention set forth above I have hereunto set my hand this 14th day of June, 1911.

JEREMIAH V. B. PARKES.

Witnesses:
FREDK. C. FRAENTZEL,
FREDK. H. W. FRAENTZEL.

---

Copies of this patent may be obtained for five cents each, by addressing the "Commissioner of Patents. Washington, D. C."